(12) United States Patent
Kerchaert et al.

(10) Patent No.: US 6,397,674 B1
(45) Date of Patent: Jun. 4, 2002

(54) METHOD AND APPARATUS FOR SENSING THE LEVEL OF FLUID WITHIN A CONTAINER

(75) Inventors: Robert B Kerchaert, Linden; Leon P Brank, Waterford; Christopher Barranger, Davison, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/578,342

(22) Filed: May 24, 2000

(51) Int. Cl.[7] .......................... G01F 23/30; G01F 23/36
(52) U.S. Cl. ............................. 73/314; 73/311; 73/313
(58) Field of Search ......................... 73/305, 311, 314, 73/304 R, 313, 322.5; 340/625, 623

(56) References Cited

U.S. PATENT DOCUMENTS

| | | | |
|---|---|---|---|
| 1,746,828 A | * 2/1930 | Gelatt | 73/311 |
| 2,098,085 A | * 11/1937 | D'Arcey | 73/317 |
| 2,486,930 A | * 11/1949 | Giers et al. | 73/313 |
| 4,047,048 A | 9/1977 | Demido | 307/118 |
| 4,402,209 A | 9/1983 | Di Domenico | 73/1 H |
| 4,500,761 A | 2/1985 | Kubota et al. | 200/84 |
| 4,557,144 A | 12/1985 | Lucchini | 73/313 |
| 4,706,707 A | 11/1987 | Betterton et al. | 137/565 |
| 4,841,771 A | 6/1989 | Glover et al. | 73/317 |
| 4,875,370 A | * 10/1989 | Spitzer | 73/309 |
| 5,027,656 A | 7/1991 | Garrison | 73/313 |
| 5,042,300 A | 8/1991 | Benjey et al. | 73/308 |
| 5,117,693 A | 6/1992 | Duksa | 73/317 |
| 5,146,784 A | 9/1992 | Maresca, Jr. et al. | 73/313 |
| 5,150,615 A | 9/1992 | Rymut et al. | 73/313 |
| 5,267,475 A | 12/1993 | Gaston | 73/319 |
| 5,294,917 A | 3/1994 | Wilkins | 340/625 |
| 5,635,621 A | 6/1997 | Lawson | 73/1.73 |
| 5,666,851 A | * 9/1997 | Bacon | 73/313 |

* cited by examiner

*Primary Examiner*—Hezron Williams
*Assistant Examiner*—Katina Wilson
(74) *Attorney, Agent, or Firm*—Mark P Calcaterra

(57) ABSTRACT

An apparatus for sensing a level of fluid within a container. The apparatus includes a support coupled to the container. The apparatus additionally includes first and second floats. Each of the first and second floats is pivotally coupled to the support proximate a first end. The apparatus further includes a position sensing mechanism for sensing the relative positions of the first and second floats and responsively determining the level of fluid within the container.

21 Claims, 3 Drawing Sheets

METHOD AND APPARATUS FOR SENSING THE LEVEL OF FLUID WITHIN A CONTAINER

BACKGROUND OF THE INVENTION

1. Field of the Invention

The present invention generally relates to fluid level sensing. More particularly, the present invention relates to a method and an apparatus for sensing the level of fluid in a reservoir which incorporate a pair of pivotally mounted floats. In one particular application, the present invention relates to a method and apparatus for sensing the level of fuel within a gas tank of a motor vehicle.

2. Discussion

In automotive fuel tanks, it is common practice to utilize a fuel pick-up device with or without an intake fuel pump and also supporting a fuel level indicating mechanism. The fuel indicating mechanism typically has an elongated rod with a free end supporting a float which moves along with changes in fuel levels. The other end of the rod is pivotally mounted to an indicating or sensor mechanism. The indicating mechanism typically includes an elongated electrical resistance grid and a contact pad which moves with movements of the float and rod as the fuel level changes. The movement of the contact pad along the resistance grid changes electrical characteristics of a circuit, thus providing a variable input to a fuel indicator gauge located within the passenger compartment of the associated vehicle.

The aforedescribed fuel indicators or sensors within the fuel tank are generally known. An example of such an indicator is found in commonly assigned U.S. Pat. No. 4,841,771 which is hereby incorporated by reference as if fully set forth herein. In this patent, a level sensing device includes a single float member which follows liquid fuel changes in the tank. The float member is attached to a free end of a float rod. A molded crank arm member is operably connected to the float rod. The crank arm supports a metal contact carrying member which has an elongated arm extending therefrom. Rotation of the rod produces corresponding rotation of the crank arm. Resultantly, arm and the contact pad are moved along a surface on an arcuately shaped resistor board.

While known fuel indicators or sensors have proven to operate satisfactorily for their intended purposes, they are all associated with limitations For example, many known indicators or sensors may occasionally reflect a fuel level which is not completely accurate due to certain operating conditions. Such operating conditions which may effect the accuracy of known indicators or sensors include vehicle parking or operation on inclined surfaces and sloshing of fuel during vehicle operation. A need remains in the art for more accurately determining the level of fluid in a container, such as a fuel tank, throughout a range of motor vehicle operations.

SUMMARY OF THE INVENTION

It is a general object of the present invention to provide a method and an apparatus for more accurately sensing a level of fuel within a fluid receptacle.

In one form, the present invention provides an apparatus for sensing a level of fluid within a container. The apparatus includes a support coupled to the container. The apparatus additionally includes first and second floats. Each of the first and second floats is pivotally coupled to the support proximate a first end. The apparatus further includes a position sensing mechanism for sensing the relative positions of the first and second floats and responsively determining the level of fluid within the container.

In another form, the present invention provides a method for sensing the level of fluid within a container. The method includes the following general steps:

pivotably mounting a first float within the container;

pivotably mounting a second float within the container;

determining a position of the first and second floats; and calculating the fuel level within the container as a function of the positions of the first and second floats.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
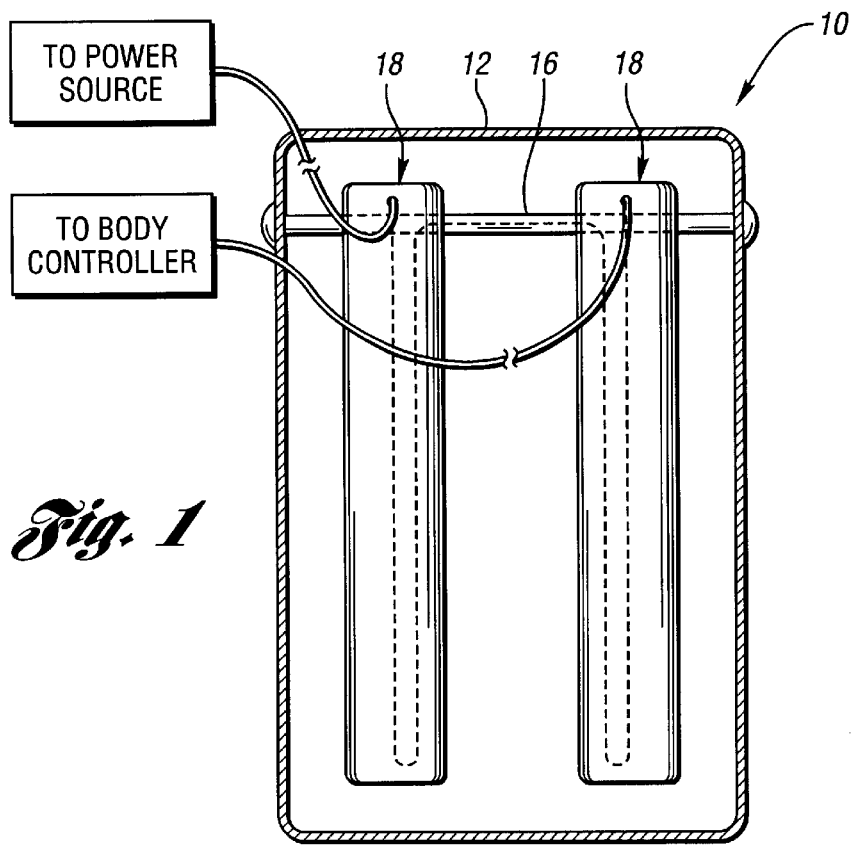
FIG. 1 is an end view of an apparatus for fluid level sensing constructed in accordance with the teachings of a first preferred embodiment of the present invention, the apparatus shown operatively associated with a fuel tank (shown in cross-section) of a motor vehicle, the gas tank being empty.
Figure 2:
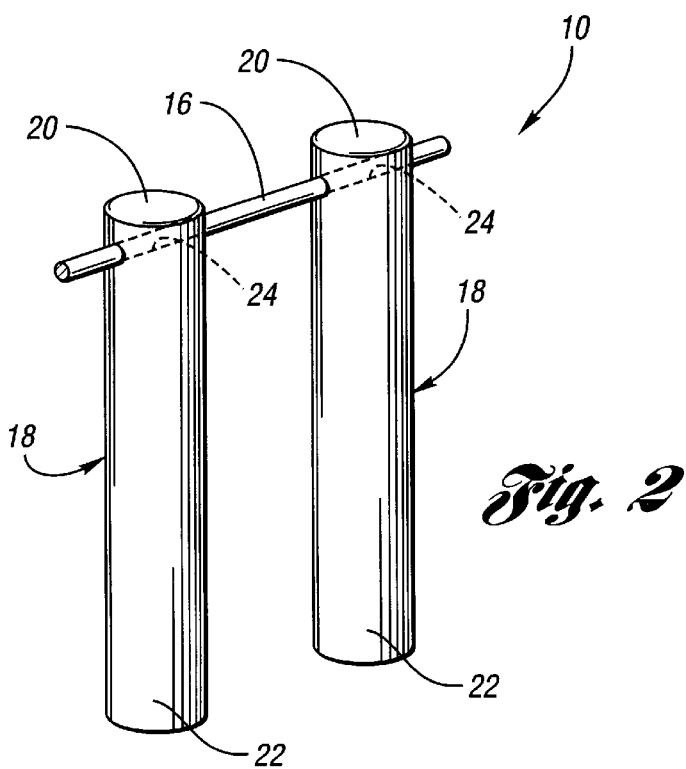
FIG. 2 is a perspective view of the apparatus for fluid level sensing of the first preferred embodiment of the present invention.
Figure 3:
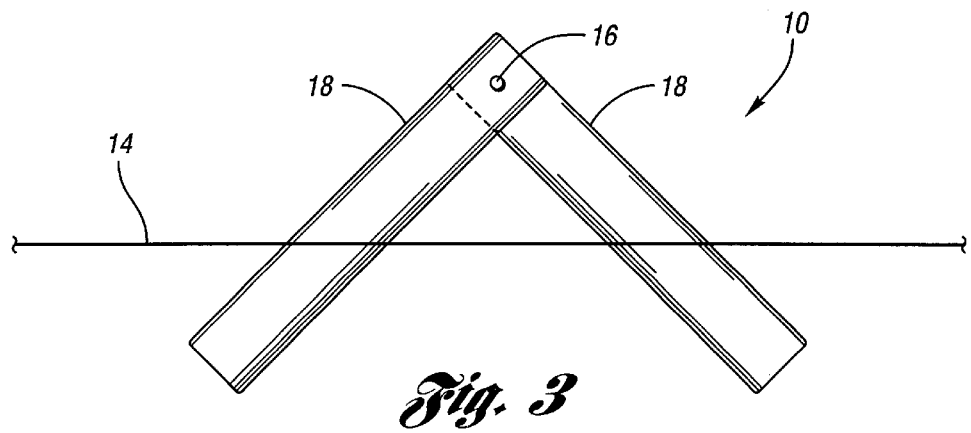
FIG. 3 is a simplified side view of the apparatus for fluid level sensing of the first preferred embodiment of the present invention, illustrating the float positions at a half-full fluid level.

With initial reference to FIG. 1, an apparatus for sensing the level of fluid within a container constructed in accordance with the teachings of a first preferred embodiment of the present invention is illustrated and generally identified at reference numeral 10. The apparatus for sensing the level of fluid 10 is shown operatively associated with a container 12. In the embodiment illustrated, the container 12 is a fuel tank for a motor vehicle which stores fuel 14 (see FIGS. 3 and 4). It will become apparent to those skilled in the art that the particular application shown in FIG. 1 is merely exemplary. In this regard, the teachings of the present invention are equally applicable for measuring the level of fluid within other containers. Furthermore, the teachings of the present invention may be adapted for determining the level of other fungible material within a container, such as grain and the like.

With continued reference to the environmental view of FIG. 1 and additional reference to FIGS. 2 through 5, the apparatus for sensing a level of fluid 10 of the present invention will be further described. The apparatus 10 is illustrated to include a support 16 coupled to the container 12. As illustrated, the support 16 is a pivot shaft. In the preferred embodiment, the support 16 extends across the entire width of the container 12. The support 16 is preferably oriented generally horizontal and positioned proximate to an upper end of the container 12.

The apparatus for sensing a level of fluid 10 of the present invention further includes a plurality of floats 18. In the particular application illustrated, the plurality of floats 18 includes two floats. However, three or more floats 18 may be incorporated within the teachings of the present invention. As will become understood below, the floats 18 assist in more accurately determining the level of the fluid 14 within the container by monitoring the fluid level at multiple points within the container 12.

The floats 18 are shown to preferably be substantially identical in construction having a first or upper end 20 and a second or lower end 22. The floats are constructed of a buoyant material such as a blow molded plastic or like material. In the exemplary embodiment, the floats 18 have a generally cylindrical shape and are pivotably coupled to the support 16 proximate their first ends 20. Explaining further, the support 16 may pass through apertures 24 provided proximate the first ends 20.

Figure 4:
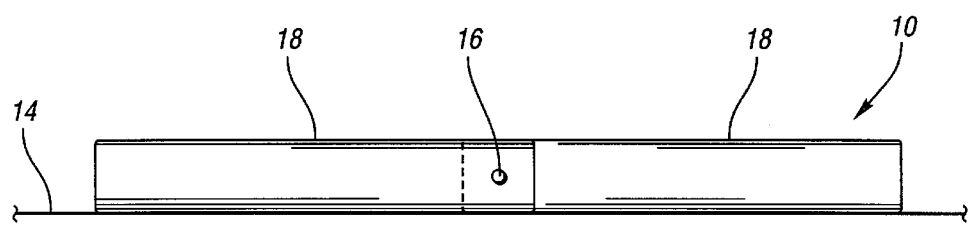
FIG. 4 is a simplified side view of the apparatus for fluid level sensing of the first preferred embodiment of the present invention similar to FIG. 3, illustrating the float positions at a completely full fluid level.
Figure 5:
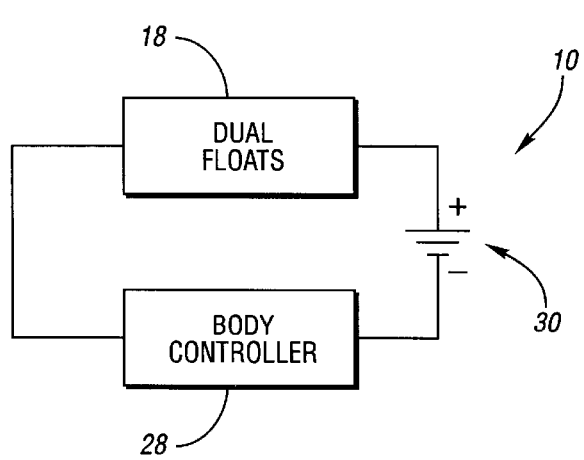
FIG. 5 is a schematic diagram of an exemplary electrical circuit of the apparatus for fluid sensing of the first preferred embodiment of the present invention.

The floats 18 are pivotable between first positions (shown in FIGS. 1 and 2) and second positions (shown in FIG. 4). In their first positions, the floats 18 are oriented generally vertical in response to the absence of fuel 14 from the container 12. In their second positions, the floats 18 are oriented substantially horizontal in response to a full fuel level within the container 12. In the side view represented in FIG. 3, it can be seen that one of the floats 18 preferably rotates between the first and second positions in a clockwise direction, whereas the other float 18 rotates between the first and second positions in a counterclockwise direction. While not illustrated, in certain application it may be desirable to incorporate a mechanism interbetween the floats 18 and the supports 16 which limits the floats to such opposite rotations.

The apparatus for sensing the level of fluid 10 of the present invention further includes a position sensing mechanism for sensing the relative positions of the first and second floats 18 and responsively determining the level of fluid 14 within the container 12. The position sensing mechanism is illustrated to include a body controller or body control module 28. As most particularly shown in the environmental view of FIG. 1 and the schematic diagram of FIG. 5, the floats 18 are connected to a power source 30 such as the vehicle battery. The body controller 28 is operative for measuring an electric conductance which varies according to the relative positions of the first and second floats 18. For example, when the floats 18 are in their first positions, a relative angle of 0 degrees is established therebetween and a first conductance is measured. When the container 12 is full, the floats 18 are oriented generally horizontal and the angle of 180 degrees between the floats 18 generates a second conductance. The conductance will vary accordingly between the first conductance and the second conductance. In this manner, an average level of the fluid 14 may be determined through sampling of various points.

Figure 6:
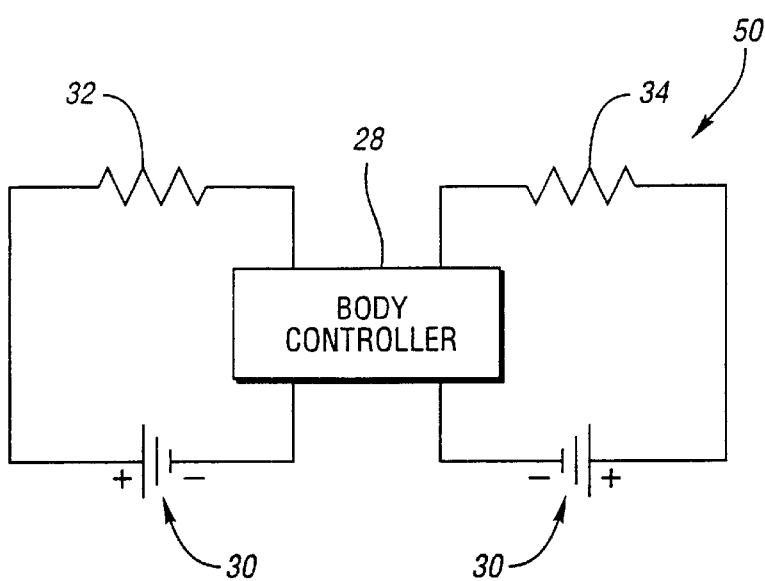
FIG. 6 is a schematic diagram of an exemplary electrical circuit of an apparatus for fluid sensing of the second preferred embodiment of the present invention.

With reference to the schematic diagram of FIG. 6, an exemplary electrical circuit of an apparatus for sensing a level of fluid constructed in accordance with a second preferred embodiment of the present invention is illustrated and generally identified at reference numeral 50. The apparatus 50 of the second preferred embodiment is similar to the first preferred embodiment in that it incorporates a substantially identical support 16 and a pair of floats 18. The apparatus 50 of the second preferred embodiment differs in the manner in which a position sensing mechanism functions to sense the relative positions of the first and second floats 18 and responsively determine the level of fluid 14 within the container. Explaining further, the apparatus 50 of the second preferred embodiment incorporates a first resistor 32 which is operatively associated with one of the floats 18 and a second resistor 34 which is operatively associated with the other of the floats 18. The resistors 32 and 34 provide a signal to the body controller 28 which is indicative of the positions of the associated floats 18. The body controller 28 calculates an average resistance to determine an average angular position of the floats 18 for more accurately determining the level of fluid 14 within the container 12. One suitable technique for determining the angular position of the floats 18 in response to a change of resistance is described in commonly assigned U.S. Pat. No. 4,841,771 which is referenced above.

Figure 7:
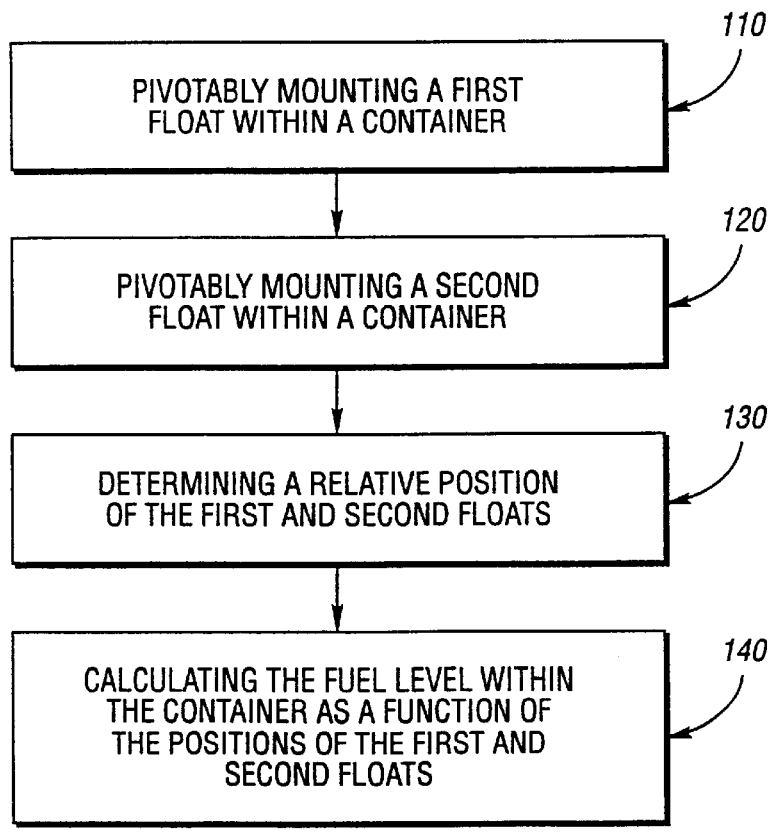
FIG. 7 is a simplified view illustrating the general steps of a preferred method of the present invention.

Turning now to the simplified view of FIG. 7, the general steps of a preferred method of the present invention are illustrated. The present invention includes a first general step 110 of pivotably mounting a first float 18 within the container.

The method of the present invention includes the second general step 120 of pivotably mounting a second float 18 within the container 12.

The method of the present invention includes the third general step 130 of determining a relative position of the first and second floats 18.

The method of the present invention includes a fourth general step 140 of calculating the fuel level within the container 12 as a function of the positions of the first and second floats 18.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for sensing a level of fluid within a container in combination with the container, the apparatus comprising:

a support coupled to the container having an axis;

a first float having first and second ends, the first float pivotably coupled about the axis of the support proximate the first end, the first float being buoyant so that the first float pivots about the axis defining an angular position of the first float;

a second float having first and second ends, the second float displaced from the first float and pivotably coupled about the axis of the support proximate the first end, the second float being buoyant so that the second float pivots about the axis defining an angular position of the second float; and a position sensing mechanism for sensing the angular positions of the first and second floats and responsively determining the level of fluid within the container.

2. The apparatus for sensing a level of a fluid within a container of claim 1, wherein the support includes a horizontally disposed shaft.

3. The apparatus for sensing a level of a fluid within a container of claim 1, wherein the support is located proximate an upper end of the container.

4. The apparatus for sensing a level of a fluid within a container of claim 1, wherein the first and second floats are pivotable between a first position and a second position such that the first and second floats are in the first position when the container is empty and in the second position when the container is full.

5. The apparatus for sensing a level of a fluid within a container of claim 4, wherein the floats are oriented generally vertical when the container is empty and oriented generally horizontal when the container is full.

6. The apparatus for sensing a level of a fluid within a container of claim 4, wherein the position sensing mechanism is operative for determining the relative positions of the first and second floats based on a change of conductance as the first and second floats are pivoted between their first and second positions.

7. The apparatus for sensing a level of a fluid within a container of claim 1, wherein the container is a fuel tank for a motor vehicle.

8. The apparatus of claim 1, wherein the second float pivots about the axis of the support in a direction opposite to the first float.

9. A motor vehicle comprising;

a fuel tank;

a support coupled to the fuel tank, the support having an axis;

a first float having first and second ends, the first float being pivotably coupled about the axis of the support proximate the first end, the first float being buoyant so that the first float pivots about the axis defining an angular position of the first float;

a second float having first and second ends, the second float displaced from the first float and pivotably coupled about the axis of the support proximate the first end, the second float being buoyant so that the second float pivots about the axis defining an angular position of the second float; and a position sensing mechanism for sensing the angular positions of the first and second floats and responsively determining a level of fluid within the fuel tank.

10. The motor vehicle of claim 9, wherein the support includes a horizontally disposed shaft.

11. The motor vehicle of claim 9, wherein the support is located proximate an upper end of the fuel tank.

12. The motor vehicle of claim 9, wherein the first and second floats are pivotable between a first position and a second position such that the first and second floats are in the first position when the container is empty and in the second position when the fuel tank is full.

13. The motor vehicle of claim 12, wherein the floats are oriented generally vertical when the container is empty and oriented generally horizontal when the fuel tank is full.

14. The apparatus of claim 9, wherein the second float pivots about the axis of the support in a direction opposite to the first float.

15. The motor vehicle of claim 12, wherein the position sensing mechanism is operative for determining the relative positions of the first and second floats based on a change of conductance as the first and second floats are pivoted between their first and second positions.

16. A method for sensing a level of fluid within a container, the method comprising the steps of:

providing a container;

mounting a support having an axis to the container;

pivotably mounting a first float about the axis of the support, the first float being buoyant so that the first float pivots about the axis defining an angular position of the first float;

pivotably mounting a second float about the axis of the support displaced from the first float, the second float being buoyant so that the second float pivots about the axis defining an angular position of the second float;

determining the angular position of the first and second floats; and calculating the fuel level within the container as a function of the angular positions of the first and second floats.

17. The method for sensing a level of a fluid within a container of claim 16, further comprising the step of providing at least one sensing mechanism for determining an angular position of the first and second floats within the container.

18. The method for sensing a level of a fluid within a container of claim 16, further comprising the step of measuring a conductance with varies according to the relative angular positions of the first and second floats.

19. The method for sensing a level of a fluid within a container of claim 16, further comprising the steps of measuring a first resistance which varies according to the angular position of the first float and measuring a second resistance which varies according to the angular position of the second float.

20. The method for sensing a level of a fluid within a container of claim 19, further comprising the step of comparing the first resistance to the second resistance to determine an average position of the first and second floats.

21. The method of claim 16, wherein the second float pivots about the axis of the support in a direction opposite to the first float.

* * * * *